United States Patent
Lundh et al.

(10) Patent No.: US 6,765,899 B1
(45) Date of Patent: Jul. 20, 2004

(54) METHOD AND AN APPARATUS FOR CLIPPING SIGNALS IN A CDMA SYSTEM

(75) Inventors: Peter Lundh, Skärholmen (SE); Göran Skoog, Göteborg (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/489,673

(22) Filed: Jan. 24, 2000

(30) Foreign Application Priority Data

Jan. 29, 1999 (SE) .............................................. 9900297

(51) Int. Cl.[7] .............................................. H04B 7/216
(52) U.S. Cl. .................... 370/342; 455/114.2; 455/522; 370/441; 375/296
(58) Field of Search ............................... 370/335, 342, 370/441, 252, 328, 329; 455/522, 349, 114.2; 375/146, 296

(56) References Cited

U.S. PATENT DOCUMENTS

| | | | |
|---|---|---|---|
| 5,535,191 A | * 7/1996 | Park ........................... 370/228 |
| 5,621,762 A | 4/1997 | Miller et al. | |
| 5,926,500 A | * 7/1999 | Odenwalder ................ 370/335 |
| 6,236,864 B1 | * 5/2001 | McGowan et al. ......... 455/522 |
| 6,266,320 B1 | * 7/2001 | Hedberg et al. ............ 370/206 |
| 6,366,570 B1 | * 4/2002 | Bhagalia ..................... 370/342 |

FOREIGN PATENT DOCUMENTS

| | | |
|---|---|---|
| GB | 2 313 525 A | 11/1997 |
| WO | 96/38944 A1 | 12/1996 |

* cited by examiner

*Primary Examiner*—Ricky Ngo
*Assistant Examiner*—Kevin Mew
(74) *Attorney, Agent, or Firm*—Nixon & Vanderhye, P.C.

(57) ABSTRACT

In a method and an apparatus for clipping CDMA carriers clipping for each CDMA carrier is performed on separate circuit boards and the clipping circuit has access to information regarding all carriers to be amplified by the same amplifier. Thus, since each carrier is clipped separately from all other carriers fed to the same amplifier, but having knowledge of the other carriers, a malfunction of the circuit board comprising the clipping circuit and/or clipping evaluation logic, will only affect that particular carrier and the other carriers can still be transmitted. Also, since clipping is carried out for each carrier separately, but taking into account information regarding the other carriers to be amplified by the same power amplifier, the clipping can take phase information into account when determining the clipping factor.

8 Claims, 1 Drawing Sheet

METHOD AND AN APPARATUS FOR CLIPPING SIGNALS IN A CDMA SYSTEM

TECHNICAL FIELD

The present invention relates to a method and an apparatus for obtaining redundancy in a multi-carrier CDMA (Code Division Multiplex Access) system and in particular to a method and a system which is capable of reducing the ratio between the peak signal and the average signal in such a system, the so called Crest factor.

BACKGROUND OF THE INVENTION AND PRIOR ART

In radio transmission systems, power amplifiers are used in the base stations in order to obtain a sufficiently high output power. The power amplifiers used in conventional radio base stations meet requirements such as high frequency range and high linearity. However, the efficiency of conventional power amplifiers is poor.

Furthermore, it can be shown that if the ratio between the peak signal and the average signal is low, the efficiency of an output amplifier increases. The ratio between the peak signal and the average signal is commonly referred to as the Crest factor. It is therefore favourable that the Crest factor is kept as low as possible, while maintaining performance at a required level.

In CDMA (Code Division Multiplex Access) systems, several spreading channels, which overlap both in time and frequency, are added on top of each other, thereby forming a CDMA carrier. The CDMA carrier is then transmitted over an air interface to mobile telephones or other terminals.

In some CDMA systems, several CDMA carriers are amplified by a single power amplifier, a so called Multi Carrier Power Amplifier (MCPA). Furthermore, the spreading codes of the CDMA system behave in a random manner and therefore the peak signal of a CDMA carrier becomes high. The peak signal is the signal formed by all sub-signal vectors pointing in the same direction and is therefore equal to the peak signal of each sub-signal multiplied by the number of sub-signals. The peak-to-average signal ratio becomes even higher when several carriers are amplified by the same power amplifier (MCPA). This is not desired since the Crest factor then becomes higher.

In order to solve this problem, the amplitude of each carrier may be limited by clipping the signal before the channel shaping filter. The clipping procedure may be carried out in the analogue or the digital domain. Since the clipping is carried out before the channel shaping filter, no spectral widening will occur, which otherwise would interfere with signal in neighbouring channels.

Another way of limiting the peak signal of the CDMA system is to clip-the sum of the base-band signal vectors corresponding to each CDMA carrier. Thereupon the different carriers are separated, filtered in a channel shaping filter, modulated and amplified by a multi carrier power amplifier (MCPA).

Furthermore, European patent application No. EP 0 849 905 discloses a CDMA multi code transmitter, wherein spread spectrum base band signals are summed and transmitted. The power consumption is reduced by delaying signals before the baseband signals are summed, so that the transmission timing of the different baseband signals are shifted with respect to each other.

However, none of the techniques above is capable of providing redundancy in the clipping procedure. Also, the techniques according to the above do not provide optimal performance, since the clipping is performed in the base band, and do not take into account the different phases of different CDMA carriers, when these are to be amplified by the same power amplifier.

SUMMARY

It is an object of the present invention to increase the reliability of a CDMA system and at the same time reduce the Crest factor of the system.

This object is obtained by a method and an apparatus wherein clipping for each CDMA carrier is performed on separate circuit boards in a CDMA transmitter, and where the clipping circuit has access to information regarding all carriers to be amplified by the same amplifier.

Thus, since each carrier is clipped separately from all other carriers fed to the same amplifier, but having knowledge of the other carriers, a malfunction of the circuit board comprising the clipping circuit and/or clipping evaluation logic will only affect that particular carrier and the other carriers can still be transmitted correctly.

Furthermore, clipping is carried out for each carrier separately and taking into account information regarding the other carriers to be amplified by the same power amplifier. The clipping procedure can therefore take phase information into account when determining the clipping factor. Therefore, an optimum Crest factor can be obtained for the composite CDMA signal transmitted via the common multi carrier power amplifier (MCPA).

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 1:
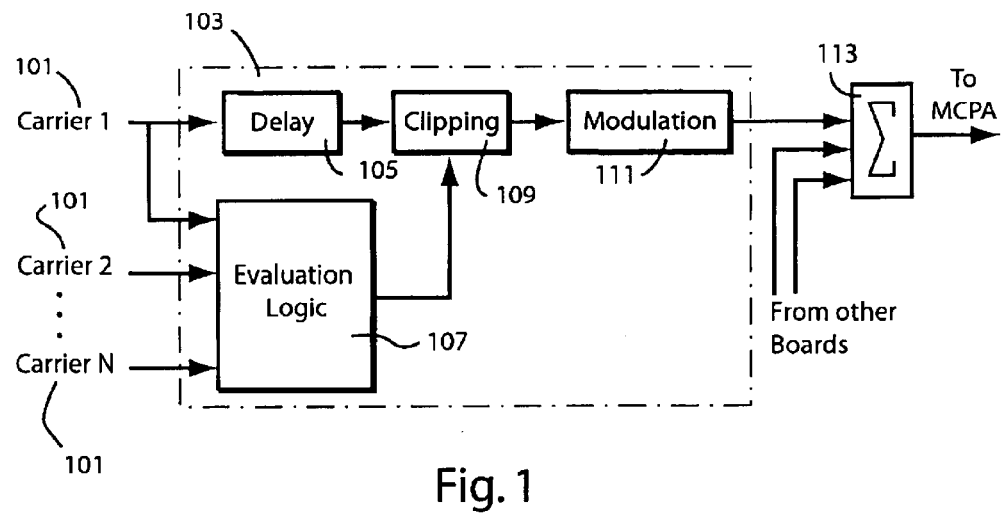
FIG. 1 is a schematic diagram illustrating a circuit board arranged to clip one CDMA carrier.

In FIG. 1, a schematic diagram illustrating a circuit board arranged to clip one CDMA carrier is shown. Thus, a number N, N being a positive integer ≧1, of CDMA carriers 101 which are to be amplified by a common amplifier, a so-called multi carrier power amplifier (MCPA), are connected to a circuit board 103.

The carrier to be clipped by the apparatus, here denoted carrier 1, is connected to a delay unit 105 and to an evaluation logic unit or clipping evaluator 107. The delay unit 105 is connected to a clipping circuit 109, which is arranged to clip the carrier 1 in response to a control signal supplied by the evaluation logic unit 107.

The other carriers, i.e. carriers 2-N, are also connected to the evaluation logic unit 107. Hence, all carriers to be amplified by the same MCPA are connected to the evaluation logic unit 107, which therefore has access to all the carriers to be amplified by the same MCPA. The evaluation logic unit calculates and estimates the amplitude of the composite base-band signal and sends clipping information to the clipping circuit 109. The clipping information can for example be a control signal indicating a factor in the range [0–1] which the carrier 1 should be multiplied with.

The carrier to be clipped is delayed in the delay unit 105 in order to be phase matched with the clipping information, which can be delayed due to the processing time in the evaluation logic unit 107.

The clipping circuit 109 is connected to a modulation unit or modulator 111, wherein the clipped carrier 1 is modulated. The output terminal of the modulation unit 111 is connected to a summation circuit 113 which in turn is connected to the MCPA (not shown).

Figure 2:
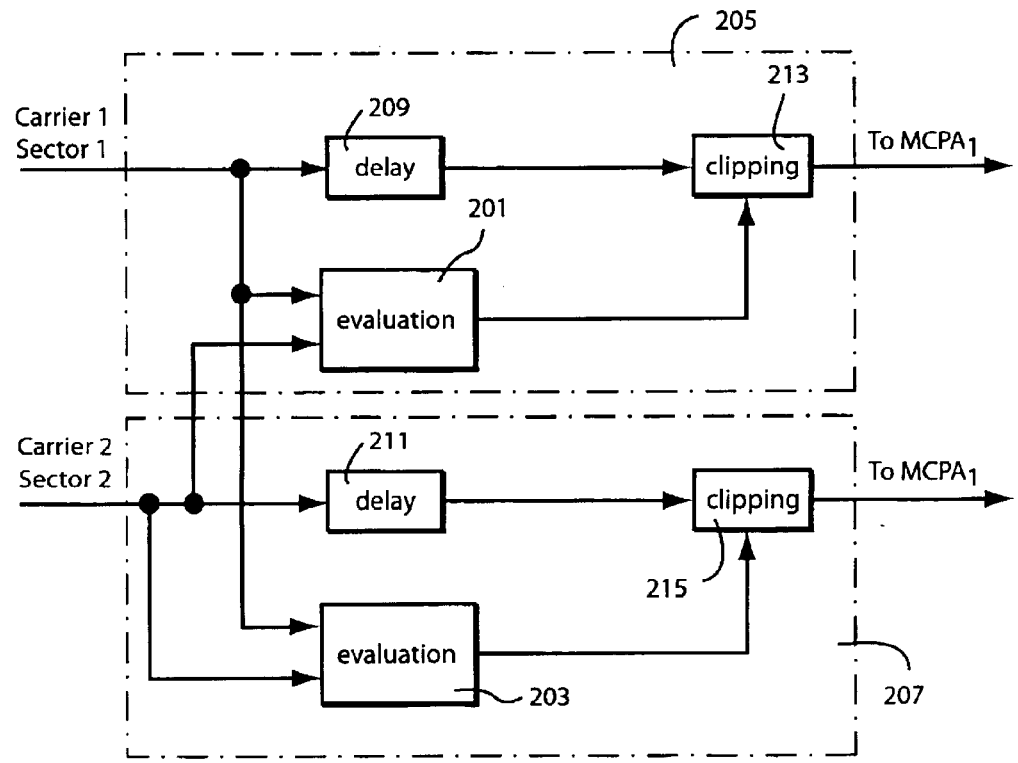
FIG. 2 is a schematic diagram illustrating clipping in a CDMA system comprising two CDMA carriers for each power amplifier.

In FIG. 2, an example employing the principle according to the embodiment described in conjunction with FIG. 1 is shown. Thus, two carriers, carrier 1 and carrier 2, are to be transmitted in the same sector of a transmission system and to be amplified by the same power amplifier. The two carriers are connected to two different evaluation units 201 and 203 located on different circuit boards 205 and 207.

Carrier 1 is also connected to a delay unit 209 located on the circuit board 205, and carrier 2 is connected to a delay unit 211 located on the circuit board 207. The delay units 209 and 211 are connected to clipping circuits 213 and 215, respectively. The clipping circuits 213 and 215 are also connected to the evaluation units 201 and 203, respectively, in order to receive information therefrom. The two evaluation units 201 and 203 hence both have access to all carriers, i.e. carrier 1 and carrier 2, to be amplified by the same amplifier. Based on this information the evaluation units calculate suitable factors which are transmitted to the clipping circuits 213 and 215, respectively.

Since all carriers are evaluated together on each circuit board, redundancy is obtained in the transmission system. Thus, evaluation is carried out on each board for all carriers, but only some of the carriers are clipped on the same circuit board. In the examples described herein one carrier is clipped on each circuit board, but two or more could of course be clipped if this would turn out to be advantageous. Thus, if one circuit board should malfunction only the CDMA carrier(s) clipped and processed on that particular circuit board would be affected. This is of course advantageous, since the robustness of the system increases.

Also, since clipping is performed separately for each carrier on different circuit boards, but the clipping evaluation is performed for the composite CDMA signal an optimum crest factor is obtained for the composite CDMA signal transmitted via the multi carrier power amplifier (MCPA).

What is claimed is:

1. An apparatus for limiting amplitude of a code division multiple access (CDMA) signal comprising plural CDMA carriers to be amplified by a same power amplifier, comprising:
    a separate clipping circuit for each CDMA carrier;
    a separate clipping evaluator unit for each CDMA carrier, each clipping evaluator unit being connected to all CMDA carriers to be amplified by the same power amplifier but outputting a control signal which is applied to an associated separate clipping circuit for a same CDMA carrier whereby the associated separate clipping circuit clips the same CDMA carrier in response to the control signal.

2. An apparatus according to claim 1, wherein each of plural separate clipping circuits are located on separate circuit boards.

3. An apparatus according to claim 2, wherein each separate clipping evaluator unit is located on a same circuit board as its associated separate clipping circuit.

4. An apparatus according to claim 1, wherein at least two CDMA carriers are clipped on the same circuit board.

5. A method of limiting amplitude of a code division multiple access (CDMA) signal comprising plural CDMA carriers to be amplified by a same power amplifier, comprising:
    separately generating a separate clipping control signal for each CDMA carrier by evaluating all CDMA carriers to be amplified by the same power amplifier;
    applying the separate clipping control signal generated for a specific CDMA carrier to a clipping circuit which clips the specific CDMA carrier in response to the separate clipping control signal.

6. The method of claim 5, further comprising performing clipping for each CDMA carrier on a separate circuit board.

7. The method of claim 5, further comprising generating the separate clipping control signal for the specific CDMA carrier on the same circuit board upon which the clipping is performed.

8. The method of claim 5, further comprising clipping at least two CDMA carriers on the same circuit board.

* * * * *